(12) United States Patent
Du et al.

(10) Patent No.: US 7,243,058 B1
(45) Date of Patent: Jul. 10, 2007

(54) METHOD AND CIRCUIT FOR OPERATING A VOICE COIL ACTUATOR OF A MASS DATA STORAGE DEVICE

(75) Inventors: Tan Du, Plano, TX (US); John K. Rote, Addison, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/464,315

(22) Filed: Dec. 16, 1999

Related U.S. Application Data (63) Continuation-in-part of application No. 09/451,697, filed on Nov. 30, 1999, now Pat. No. 6,768,977.

(51) Int. Cl.
*G11B 5/55* (2006.01)
*G11B 21/08* (2006.01)
*G06F 19/00* (2006.01)
*G05B 5/01* (2006.01)
*G06B 7/62* (2006.01)

(52) U.S. Cl. .......................... 703/13; 702/38; 318/615; 360/264.7

(58) Field of Classification Search .................. 703/15, 703/14, 19, 20, 21, 2, 13; 318/615, 560, 318/145, 565, 604, 628, 635, 647; 360/264.7, 360/264.8, 264.9, 265, 264.1, 264.3; 364/266.4; 702/38
See application file for complete search history.

(56) References Cited

U.S. PATENT DOCUMENTS 4,653,681 A * 3/1987 Dreibelbis et al. ........... 228/4.5
5,146,122 A     9/1992 Hearn et al.
5,191,297 A * 3/1993 Penman et al. ............. 330/146
5,206,555 A * 4/1993 Morris et al. ................ 310/105
5,247,410 A * 9/1993 Ebihara et al. ........... 360/264.9

(Continued)

FOREIGN PATENT DOCUMENTS

EP         0 537 916 A2     4/1993

OTHER PUBLICATIONS

"Design and operation of a fully integrated BiC/DMOS head-actuator PIC for computer hard-disk drives," Williams, R.K.; Chang, A.; Cornell, M.E.; Concklin, B. IEEE Trans on Electron Devices, vol. 38, Issue 7, Jul. 1991, pp. 1590-1599.*

*Primary Examiner*—Paul Rodriguez
*Assistant Examiner*—Dwin McTaggart Craig
(74) *Attorney, Agent, or Firm*—Wade J. Brady, III; Frederick J. Telecky, Jr.

(57) ABSTRACT

A circuit (90) and method are presented to accurately determine a BEMF voltage of a VCM coil (20) after termination of a driving current in a first current direction in the coil (20). The circuit includes a circuit for activating selected VCM coil driver transistors (44–47) to apply a current to the coil (20) in a direction opposite the first current direction to generate a magnetic field to oppose eddy currents established in structures adjacent the coil (20) by the driving current. The time that the eddy current opposing current may be applied may be determined, for example, by determining a magnitude of the original current command, a time that the coil spends in flyback, or a magnitude of the original driving current, and adjusting the time of application of the eddy current opposing current accordingly.

10 Claims, 4 Drawing Sheets

U.S. PATENT DOCUMENTS

| | | |
|---|---|---|
| 5,566,369 A | 10/1996 | Carobolante |
| 5,615,064 A | 3/1997 | Blank et al. |
| 5,654,840 A | 8/1997 | Patton et al. |
| 5,729,399 A | 3/1998 | Albrecht et al. |
| 5,768,045 A | 6/1998 | Patton, III et al. |
| 5,838,515 A | 11/1998 | Mortazavi et al. |
| 5,982,130 A * | 11/1999 | Male .......................... 318/615 |
| 6,064,546 A * | 5/2000 | Takano et al. ........... 360/97.01 |
| 6,081,112 A | 6/2000 | Carobolante et al. |
| 6,094,020 A | 7/2000 | Goretzki et al. |
| 6,373,650 B1 * | 4/2002 | Pedrazzini ................... 360/75 |

\* cited by examiner

METHOD AND CIRCUIT FOR OPERATING A VOICE COIL ACTUATOR OF A MASS DATA STORAGE DEVICE

CROSS REFERENCE TO RELATED APPLICATIONS

This application is a continuation-in-part of application Ser. No. 09/451,697, filed Nov. 30, 1999, now U.S. Pat. No. 6,768,977, which is incorporated herein by reference.

BACKGROUND OF THE INVENTION

1. Field of the Invention

This invention relates to improvements in methods and circuits for operating voice coil actuator/motors (VCMs) of the type used in mass data storage devices, or the like, and more particularly to improvements in such methods and circuits that may be used to move the head mechanism of such VCM to a parked position from an operating position.

2. Relevant Background

A well-known hard disk drive assembly (HDA) is a typical mass data storage device of the type to which the invention pertains. Generally the HDA includes one or more rotating disks that carry a magnetic media to which data may be written, and from which previously written data may be read. The data is written to and read from the disk by one or more magnetic heads or transducers that are a part of a voice coil motor (VCM) assembly, which moves the heads to the desired locations at which data is to be written or read.

Figure 1:
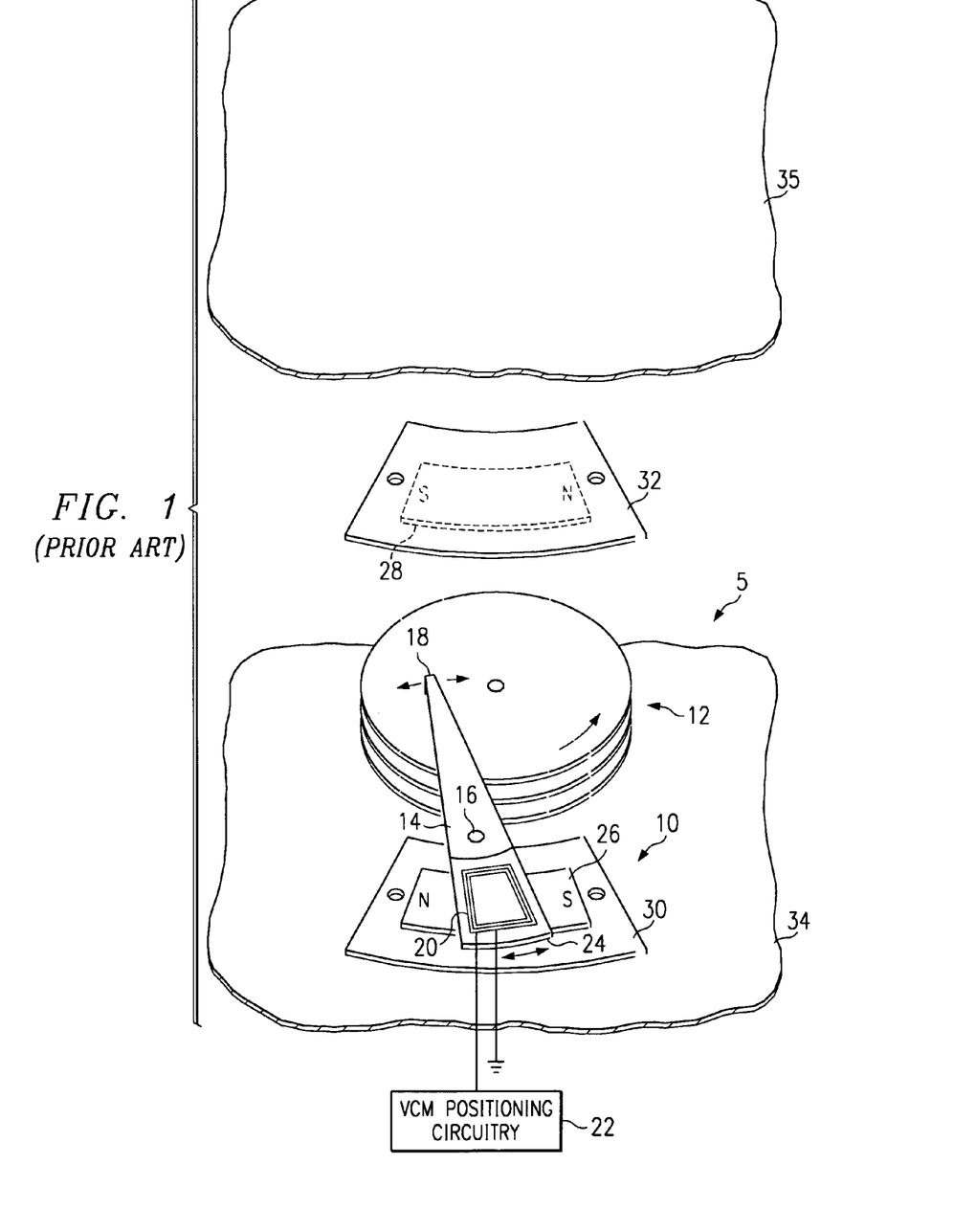
FIG. 1 is a perspective view of a portion of a mass data storage device and associated VCM assembly with which the circuit and method in accordance with a preferred embodiment of the invention may be employed.

An exploded view of a portion of a typical HDA 5 is shown in FIG. 1. The HDA 5 includes a VCM apparatus 10 in conjunction with a plurality of rotating disks 12. The VCM assembly 10 includes one or more arms 14 that are pivoted about a bearing point 16 to carry and move the heads or data transducers 18 radially inwardly and outwardly within the stack of data disks 12.

The outboard end of the arm 14 carries a coil 20 that is selectively energized by currents from VCM positioning circuitry 22. The outwardly extending end 24 of the arm 14 is located between two horizontal magnets 26 and 28, which are mounted to base plates 30 and 32. The base plates 30 and 32 and magnets 26 and 28 are spaced apart by spacers (not shown) to allow the arm and coil portions 24 and 20 to freely swing between the magnets 26 and 28. The plates 30 and 32, spacers, and magnets 26 and 28 are securely fastened to the base plate 34. A top cover plate 35 encloses the top side of the base plate 32. The two plates 32 and 35 may physically touch or barely touch each other. Thus, as the currents from the VCM positioning circuitry 22 are applied to the coil 20, magnetic fields are established by the current induced field of coil 20 that can precisely position the heads 18 at a desired location under control of the VCM positioning circuitry 22.

When the apparatus 5 is powered down, typically the head mechanism is moved to a position (not shown) at which the heads 18 are "parked" or "landed", often at the inner radius of the disk. In other cases, such as when the head is parked on a ramp, they may be parked along the outer radius of the disk. In order to properly move the heads to the park position, generally a driving current is applied to the coil 20 that is of sufficient magnitude to bring the head assembly just to the park position. However, it will be appreciated that if the head mechanism is overdriven, the delicate head mechanism and other parts of the disk assembly may sustain damage. On other hand, if the head is underdriven, the head mechanism may not reach the park position, which may result in loss of the air bearing between the head and disk surface, which may also cause damage both to the head mechanism and to the underlying magnetic media of the disk assembly 12 above which the heads 18 fly.

Figure 2:
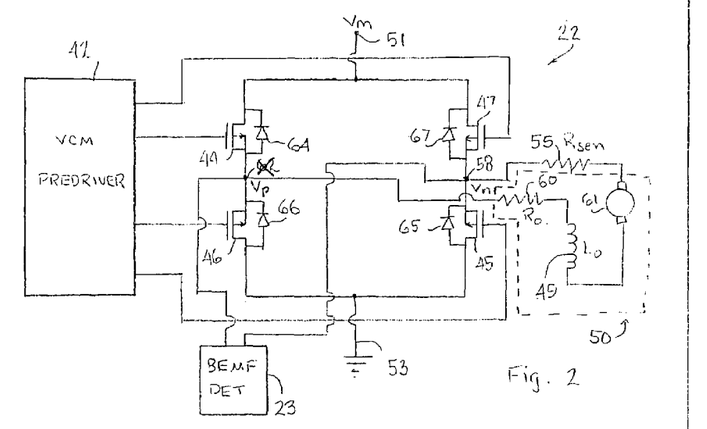
FIG. 2 is an electrical schematic diagram of a driver circuit used for positioning the head mechanism of the VCM of FIG. 1, in accordance with a preferred embodiment of the invention may be employed.

The heads are positioned by the positioning circuitry 22, also referred to herein as a servo circuit, of the type shown in FIG. 2, which also operates in the retraction or parking of the heads to their landing zone or landing ramp. The servo circuit 22 may incorporate a floating-terminal BEMF detection scheme (FLBD) 23 in its design to control the retract of the heads to their parked position. The purpose of FLBD is to extract the BEMF signal from the VCM terminal voltage difference, Vpn=Vp−Vn, at nodes 62 and 58. This is done normally by turning off all four FET's 44–47 to let Vp and Vn on nodes 62 and 58 float for a short time. After the flyback current in the VCM coil decays to a predetermined level, which is defined to be at or near zero and the rate of change of the current is also at or near zero, Vpn theoretically will approximate the BEMF voltage, since with no current, there should be no voltage drop across resistor $R_O$ 60, resistor $R_{SEN}$ 55, and the motor inductor $L_O$ 49.

One technique controlling a VCM is shown in U.S. patent application Ser. No. 09/388,508 now U.S. Pat. No. 6,184,645, filed Sep. 1, 1999, incorporated herein by reference. One technique measuring the BEMF of the coil of the actuator used in said application Ser. No. 09/388,508 now U.S. Pat. No. 6,204,629 is shown in U.S. patent application Ser. No. 09/193,803, filed Nov. 17, 1998, incorporated herein by reference.

Figure 3:
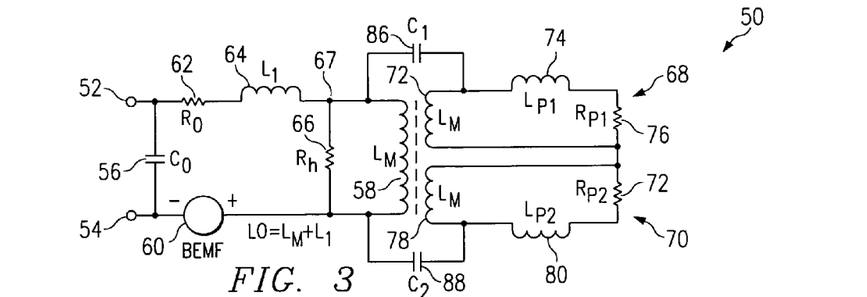
FIG. 3 is an electrical schematic diagram of a model of the VCM assembly of FIG. 1, in accordance with a preferred embodiment of the invention.

With reference again to FIG. 2, the circuit 22 includes a VCM predriver circuit 42 that provides signals to drive transistors 44–47 in a selective manner by which current flows through the coil 20 of the VCM in one direction or the other to move the head of the VCM in the desired direction. Thus, for example, to move the head in one direction, transistors 44 and 45 are turned on to establish a current flow path between the voltage terminal 51 and a ground terminal 53 to move the head in a first direction. To move the head in the opposite direction, transistors 46 and 47 are turned on to establish a current flow path through the motor coil from the motor driving potential 51 to ground 53. In the circuit embodiment shown, a sense resistor, $R_{SEN}$, 55 is shown in series with the motor inductance, $L_O$, 49 and the node Vn 58. The resistance of the coil 20 is shown as resistor 60, in series between the motor inductor 49 and the node, denoted Vp. For clarity, the remainder of the circuit elements of the VCM model 50, described in detail below with reference to FIG. 3, are lumped into element 61, except for the capacitance $C_O$ 56 and the resistor $R_h$ 66, which can be disregarded.

As mentioned, when the head is to be moved to the park position, one method that may be employed is to tristate the transistors 44–47, wait a period of time to allow the flyback current to occur and dissipate down to a predetermined magnitude. Thus, after the flyback current has dissipated to the predetermined level, the voltage appearing between nodes 62 and 58 is measured, which, at least in theory, should represent the BEMF developed across the coil 20. Since the BEMF has a value almost directly proportional to the speed of the coil of the VCM, knowing the velocity of the coil 20 enables the precise required drive current to be determined that will properly move the heads to the parked position at a controlled velocity.

However, in practice, it has been found that the BEMF that is measured using the prior art techniques does not always accurately represent the correct velocity of the coil 20, and, consequently, the head assembly controlled thereby. As discussed below, we have determined that this is due at least in part to the influence of eddy currents induced in the structures adjacent the coil 20 of the VCM on the voltage induced into the coil during its movement at the same time that the BEMF is measured.

What is needed, therefore, is a method and circuit for more accurately determining the BEMF when the VCM drivers are tristated to enable the current needed to be applied to the coil to properly park the heads at a controlled velocity to be determined.

SUMMARY OF THE INVENTION

In light of the above, therefore, method and circuit are presented for more accurately determining the BEMF when the VCM drivers are tristated to enable the voltage needed to be applied to the coil to properly park the heads to be determined.

Thus, according to a broad aspect of the invention, a circuit to determine a velocity of a coil to which a driving current is applied in a magnetic field is presented. The circuit includes a circuit to terminate the driving current in the coil and a circuit to apply a current to the coil to create a magnetic field to oppose eddy currents established in structures adjacent the coil by the driving current. A circuit is provided for measuring the BEMF in the coil after the current has been applied to oppose the eddy currents.

The time that the eddy current opposing current may be applied may be determined, for example, by determining a magnitude of the original current command, a time that the coil spends in flyback by measuring, for example, the time that coil voltage exists above a predetermined magnitude, or a magnitude of the original driving current, and adjusting the time of application of the eddy current opposing current in accordance with this value.

According to yet another broad aspect of the invention, a circuit is presented to determine a BEMF voltage of a VCM coil after termination of a driving current in a first current direction in the coil. The circuit includes a circuit for activating selected VCM coil driver transistors to apply a current to the coil in a direction opposite the first current direction to generate a magnetic field to oppose eddy currents established in structures adjacent the coil by the driving current. The time duration of the current may be determined as described immediately above.

According to still another broad aspect of the invention, a circuit is presented for use in determining a velocity of a head assembly of a VCM after termination of a driving current in a coil of the VCM. The circuit includes a circuit for activating selected VCM coil driver transistors to apply a current to the coil of the VCM to create a magnetic field that opposes eddy currents established in structures adjacent the coil by the driving current.

According to yet another broad aspect of the invention, a method is presented for determining a velocity of a coil to which a driving current is applied in a magnetic field. The method includes terminating the driving current and allowing a flyback current in the coil to reduce to below a predetermined magnitude. After the flyback current has been reduced, the method includes applying a current to the coil of magnitude and direction to cancel eddy currents in structures adjacent the coil, and measuring a BEMF in the coil, wherein a magnitude of the BEMF is directly related to the velocity of the coil.

According to still yet another broad aspect of the invention, a method is presented for determining a BEMF voltage of a coil of a VCM after termination of a driving current in the coil. The method includes determining when the driving current has been terminated, and activating selected VCM coil driver transistors to apply a current to the coil to create a magnetic field to oppose eddy currents established in structures adjacent the coil by the driving current.

BRIEF DESCRIPTION OF THE DRAWINGS

The invention is illustrated in the accompanying drawings, in which.

In the various figures of the drawing, like reference numerals are used to denote like or similar parts.

DETAILED DESCRIPTION OF THE PREFERRED EMBODIMENTS

A model 50 of the voice control actuator/motor (VCM), according to a preferred embodiment of the invention, is shown in the electrical schematic diagram of FIG. 3. The model is more fully described in said copending application Ser. No. 09/451,697 now U.S. Pat. No. 6,768,977. The model 50 takes known VCM effects into account, including eddy current effects in all the structures in the neighborhood of the actuator coil, which have been unrecognized heretofore, and which, therefore, have not been modeled. The model 50, therefore, is believed to be a more accurate representation of a physical VCM assembly and its associated electrical components than models used heretofore.

The model 50 includes a number of ideal model parts between the input terminals 52 and 54, which model or represent the actual VCM terminals of a physical VCM, such as that shown in FIG. 1. A capacitor 56 is connected between the input terminals 52 and 54, to represent the input capacitance of the system. The inductance of the motor coil 20 is modeled by serial inductor 64 and inductor 58 connected at point 67. The inductor 64 represents a winding leakage inductance of the VCM coil 20. The inductor 58 represents the mutual inductance between VCM coil and its metallic neighborhood including parts 26, 30, 28 and 32. The low end of inductor 58 is connected to input terminal 54 through a voltage source 60, which represents the back EMF (BEMF) of the coil 20. The BEMF, of course, is a time varying quantity; therefore, the voltage source 60 is likewise a varying voltage source that follows the BEMF waveform generated in the physical device.

A resistor 62 is connected in series between the top input terminal 52 and the left end of the inductor 64. The resistor 62 represents the resistance of the physical VCM coil 20. A resistor 66 is connected from a node 67 between the inductor 64 and inductor 58 to the bottom end of the inductor 58. The resistor 66 representing the magnetic hysteresis loss is in parallel with the VCM inductor 58, and would typically be of very high value. Consequently, in many applications, the resistor 66 may be ignored.

As mentioned, one of the reasons that the physical VCM does not behave as predicted by prior art models is that the coil 20 of the VCM creates eddy currents in the adjacent magnets and other structures of the VCM assembly. The eddy currents do not self-extinguish as rapidly as the flyback current, and consequently result in the creation of a voltage across the coil when the excitation voltage has been removed. Thus, top and bottom current loops 68 and 70 are included in the model 50 to consider the eddy current effects.

The loop 68 includes a mutual inductor 72, having an inductance equal to the value of the VCM mutual inductor 58, an inductor 74, and a resistor 76, connected in series. The inductor 72 represents the mutual inductance between VCM coil and the top VCM magnetic plate. The magnet plate includes the top VCM magnet 28 and the surrounding structures, including the mounting plate 32 and top cover plate 35, into which eddy currents are induced. The inductor 74 represents the leakage inductance of the top VCM magnet plate, and the resistor 76 represents the resistance of the top VCM magnet plate.

Likewise, the bottom loop 70 includes a mutual inductor 78 having a value equal to the mutual inductance of the VCM inductor 58, and inductor 80 and a resistor 72, all connected in series. The inductor 78 represents the mutual inductance between VCM coil and the bottom VCM magnetic plate, which includes the bottom VCM magnet 26, and the surrounding structures, including the mounting plate 30 and base plate 34, into which eddy currents are induced. The inductor 80 represents the leakage inductance of the bottom VCM magnet plate, and the resistor 72 represents the resistance of the bottom VCM magnet plate. The first and second loops 68 and 70 are interconnected, as shown, at one side of the inductors 72 and 78.

First and second parasitic capacitors 86 and 88 are connected between the top and bottom ends of coil 58 and the interconnection nodes of inductors 72 and 74 and inductors 78 and 80, respectively. The values of capacitors 86 and 88 may be very small. Consequently, they may be ignored in many applications.

With the recognition that the effects of the induced eddy currents affects the accuracy of the measurement of the BEMF, according to the above described model, their effects can now be taken into account in measuring the BEMF. More particularly, in accordance with a preferred embodiment of the invention, prior to measuring the BEMF, a current may be injected into the coil 20 that is of magnitude and polarity such that the eddy currents existing in the structures surrounding the coil 20 may be substantially cancelled.

Figure 4:
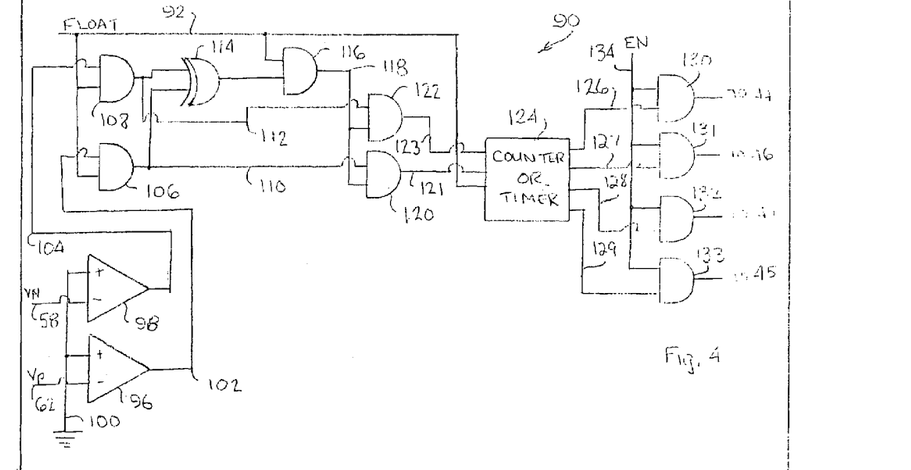
FIG. 4 is an electrical schematic diagram of a portion of one circuit that may be used to determine the time at which the flyback current has dissipated to a predetermined level to enable the measurement of the BEMF, in accordance with a preferred embodiment of the invention.

One circuit 90 by which eddy currents can be canceled or significantly reduced is shown in FIG. 4. The circuit 90 includes a number of logic gates that are enabled by a float signal on line 92 that becomes high when the VCM predriver 42 (FIG. 2) floats or tristates the driver transistors 44–47. The signals at the driver circuit nodes 62 and 58 are applied to differential amplifiers 96 and 98, respectively, which are referenced to ground or other reference potential 100 to produce outputs on respective output lines 102 and 104 when the input signals to the differential amplifiers 96 and 98 exceed the potential on the reference line 100.

The outputs from the amplifiers 96 and 98 are connected to one input of each respective AND gate 106 and 108, which are enabled by the float signal on line 92 that is applied to the other inputs thereof. The output signals on output lines 110 and 112, therefore, indicate the direction that the flyback current is flowing in the motor coil 20.

In addition, an exclusive OR (XOR) gate 114 receives the signals on lines 110 and 112 to produce an input to an AND gate 116, which also is enabled by the signal by the float signal 92. The output from the gate 116 on line 118, therefore, represents a logic state that exists only during the time that the flyback current in the motor coil 20 is above the reference voltage on line 100. The signal on line 118 thus represents an indication that the flyback is in existence, and issues a signal to enable AND gates 120 and 122 to which the output lines 110 and 112 from gates 106 and 108 are applied.

The output signals from gates 120 and 122 are applied on lines 121 and 123 to input terminals of a counter or timer 124, which also is enabled by the float signal on float line 92. The counter 124, below described in detail, is configured to determine a time that the flyback voltage exists above a predetermined magnitude, then to determine a time that either of the signals produced by AND gates 120 or 122 is high.

Thus, after the termination of the flyback current, or more particularly after its dissipation to a predetermined level, the output signals from gates 120 and 122 are both low. In this state, the counter 124 counts down, or in an opposite direction from the count that was produced during the existence of a high state from either AND gate 120 or AND gate 122. During the count down time, the counter 124 applies drive signals on lines 126–129 to selected pairs of AND gates 130–133 to produce control signals to respective pairs of drive transistors 44 and 45 or 46 and 47 in an opposite direction to the most recent drive current direction that existed in the motor coil 20. The output gates 130–133 are enabled by a user supplied enable signal on line 134, so that the user may, if desired, exclude the eddy current canceling feature provided by the invention by removing the enabling signal.

It should be noted that although reference is made to the counter counting up and down, it should be understood that the count may be performed by analog counting or timing devices, such as the time of charge and discharge of a capacitor. On the other hand, the timing may be performed by a physical digital counter that is clocked by appropriate clock pulses (not shown).

Figure 5:
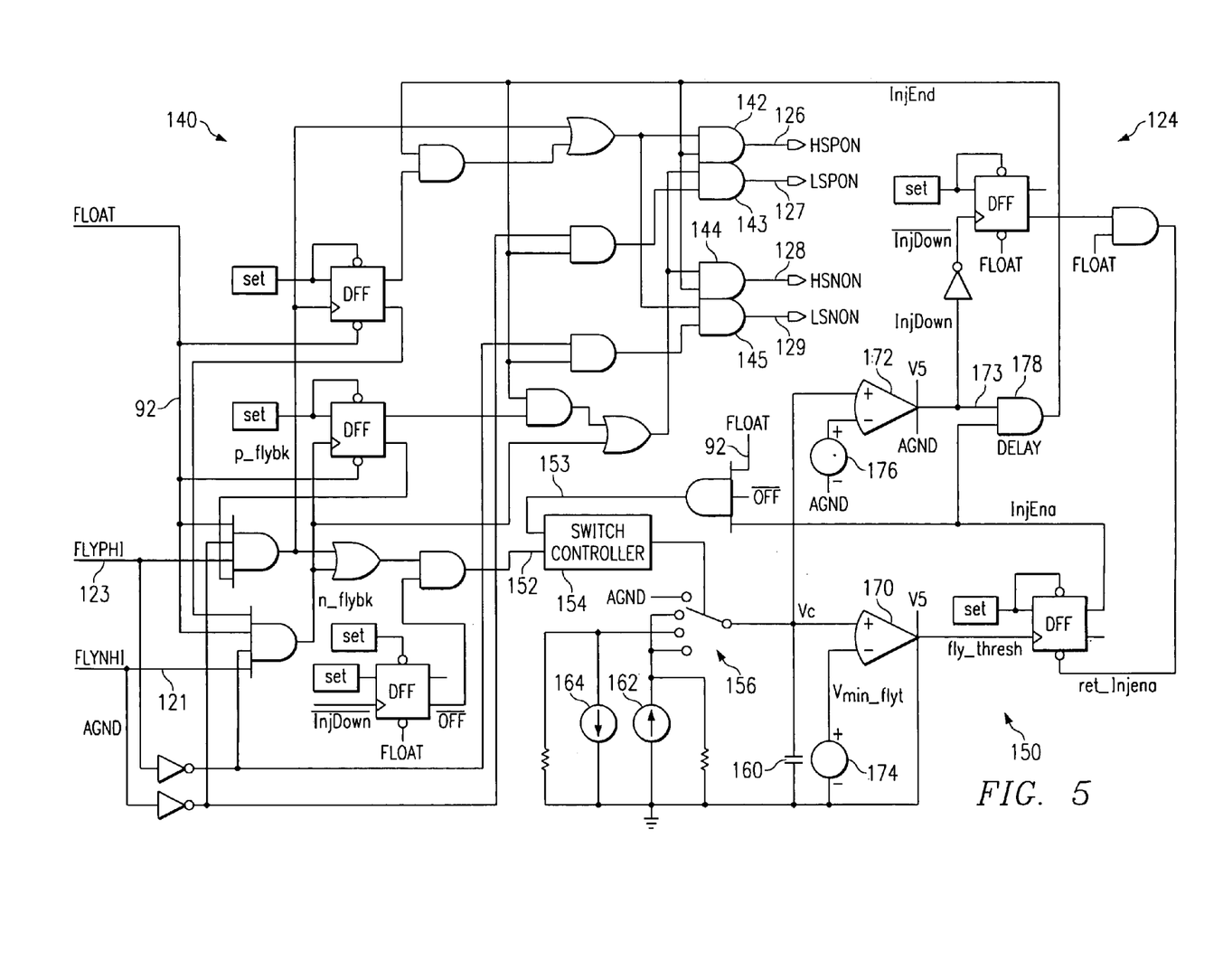
FIG. 5 is an electrical schematic diagram of a counter circuit that may be used in FIG. 4, in accordance with a preferred embodiment of the invention.

Details of the counter circuit 124 are shown in FIG. 5, to which reference is now additionally made. The counter 124 receives inputs from the detector circuit 90 on lines 121 and 123, as well as the float signal on line 92. As above described, the signals on lines 121 and 123 represent the existence of a flyback current in the coil 20. The circuit 124 has a first portion 140 that conditions the signals on lines 121 and 123 for application to the output AND gates 142–145 to deliver the output signals on lines 126–129 to the AND gates 130–133, described above. The circuit 140 insures that the flyback current indicating signals are sharp, and that they do not exist contemporaneously so that only two of the four output AND gates 142–145 will be on at the same time.

In addition, the circuit 124 includes a timing circuit 150, which receives an input on line 152 that indicates that the flyback current exists on either input line 121 or 123. The signal on line 152 is applied to a switch controller 154 that controls a switch 156. When the flyback current exists, the switch controller 154 operates to charge a capacitor 160 by a current source 162. On the other hand, when the flyback current does not exist, the switch controller 154 operates to discharge the capacitor 160 by current source 164.

The charge on the capacitor is detected by first and second differential amplifiers 170 and 172. The differential amplifier 170 is referenced to a voltage source 174 so that it can detect a minimum flyback voltage threshold, if desired. Thus, if the flyback current is not sustained for a predetermined minimum time, the eddy current canceling current is not applied. The output from the differential amplifier 170 is used to enable the switch controller 154 on line 153 to charge the capacitor 160 when the float signal exists on line 92, if the capacitor charge has exceeded the predetermined threshold.

The second differential amplifier 172 operates to enable the output AND gates 142–145 so long as the charge on the capacitor exceeds the reference voltage determined by voltage source 176. The output from the differential amplifier 172 is applied through an AND gate 178, which is enabled by the output from the threshold detecting differential amplifier 170. It should be noted that the AND gate 178 may include a predetermined time delay, if desired, depending upon the particular circuit requirements. When the output from the second differential amplifier 172 falls back to zero after the capacitor 160 has been discharged, the enable signal on line 173 is extinguished, disabling the AND gates 142–145, and also resetting the output to the switch controller 154 on line 153.

With reference again briefly to the operation of the switch controller 154, the switch positions are determined by the states of the signals on input lines 152 and 153, in accordance with the following table:

| 152 | 153 | Switch Position |
|---|---|---|
| 0 | 0 | Ground |
| 1 | 0 | Charge |
| 1 | 1 | Charge |
| 0 | 1 | Discharge |

One of the advantages realized by the timing circuit 150 is that by appropriate selection of the values of currents sourced by current sources 162 and 164, the timing of charge and discharge of the capacitor 160 can be independently controlled. Thus, during the existence of the flyback current in the winding 20, the capacitor may be charged at a first charge rate, but during the subsequent discharge of the capacitor during which the eddy current canceling current is enabled, the capacitor may be discharged at a different rate.

It can be seen that by virtue of the action of the counter/timer 124, the driving signals produced by the AND gates 142–145 exist for the necessary time to produce a current in coil 20 to eliminate or substantially reduce the eddy currents that exist in the structures surrounding the coil 20. This time would need to be established for each different model of drive, since each drive model may be differently constructed from the other, but can be determined by characterizing the drive using the VCM model described above with reference to FIG. 3, by trial and error, or by other technique.

Thus, it can be seen that the time of application of the eddy current reversing current in the embodiment presently described is based upon the time duration of the flyback current. The magnitude of the eddy currents that are established in the structures surrounding the coil 20 which are to be cancelled is a function of the duration of the flyback current which is also related to the magnitude of the driving current established in the motor coil 20.

It will be appreciated, of course, that other techniques may be employed for determining the time that the eddy current canceling current is applied. For example, a circuit may be employed to directly measure the magnitude of the driving current applied to the coil 20. Alternatively, a circuit may be employed to apply an eddy current canceling current for a time duration directly related to the magnitude of the original current command. Those skilled in the art will recognize still other techniques that may be suitable for determining the time and magnitude of the eddy current canceling current it may be suitable in each particular application.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The invention claimed is:

1. A method of back electromotive force measurement, comprising the steps of:
   (a) estimating eddy currents induced by a current in a first direction through a voice coil;
   (b) turning off a driver for the current in said first direction through said voice coil;
   (c) for a time interval, turning on a driver for a current in a second direction through said voice coil, where said second direction is opposite said first direction and said time interval is determined from the results of said estimating;
   (d) after said time interval, measuring a back electromotive force of said voice coil.

2. The method of claim 1, wherein said estimating eddy currents is by timing a decay of flyback current through said voice coil following said turning off in step (b) of claim 1.

3. The method of claim 2, wherein said timing a decay includes measuring a voltage drop across a sense resistor in series with said voice coil.

4. The method of claim 1, wherein said turning off of step (b) of claim 1 includes turning off a first pair of transistors in an H-bridge connected to said voice coil and between a power supply and a power sink, and wherein said turning on step of step (c) of claim 1 includes turning on a second pair of transistors of said H-bridge.

5. A voice coil circuit, comprising:
   (a) a current driver for a voice coil;
   (b) a positioning control circuit coupled to said current driver;
   (c) an estimator control circuit coupled to said current driver circuit and to said positioning control circuit; and
   (d) a back electromotive force measuring circuit coupled to said current driver;
   (e) wherein said estimator control circuit is operable to:
      (i) be enabled by said positioning circuit releasing control of said current driver;
      (ii) determine a time interval; and
      (iii) control said current driver to drive a current through said voice coil during said time interval and in a direction opposite to direction of current through said voice coil just prior to said positioning circuit releasing control of said current driver.

6. The circuit of claim 5, wherein said estimator control circuit determines said time interval by timing decay of a flyback current after said positioning control circuit releasing control of said current driver.

7. The circuit of claim 5, wherein said current driver includes an H-bridge with said voice coil and a current sense resistor connected between legs of said H-bridge and a power supply and a power sink connected to ends of respective legs of said H-bridge, and each leg includes a transistor plus a flyback diode.

8. A hard disk drive, comprising:
(1) at least one disk with a magnetic film coating;
(2) a read/write head assembly with a voice coil for positioning over said disk;
(3) a voice coil circuit connected to said voice coil, including:
  (a) a current driver for said voice coil;
  (b) a positioning control circuit coupled to said current driver;
  (c) an estimator control circuit coupled to said current driver circuit and to said positioning control circuit; and
  (d) a back electromotive force measuring circuit coupled to said current driver;
  (e) wherein said estimator control circuit is operable to:
    (i) be enabled by said positioning circuit releasing control of said current driver;
    (ii) determine a time interval; and
    (iii) control said current driver to drive a current through said voice coil during said time interval and in a direction opposite to direction of current through said voice coil just prior to said positioning circuit releasing control of said current driver.

9. The hard disk drive of claim 8, wherein said estimator control circuit determines said time interval by timing decay of a flyback current after said positioning control circuit releasing control of said current driver.

10. The hard disk drive of claim 8, wherein said current driver includes an H-bridge with said voice coil and a current sense resistor connected between legs of said H-bridge and a power supply and a power sink connected to ends of respective legs of said H-bridge, and each leg includes a transistor plus a flyback diode.

* * * * *